US010053141B2

(12) United States Patent
Suzuki et al.

(10) Patent No.: US 10,053,141 B2
(45) Date of Patent: Aug. 21, 2018

(54) COMMUNICATION SYSTEM

(71) Applicant: DENSO CORPORATION, Kariya, Aichi-pref. (JP)

(72) Inventors: Takashi Suzuki, Kariya (JP); Hideki Kabune, Kariya (JP); Katsuhiko Hayashi, Kariya (JP); Takaharu Kozawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/173,117

(22) Filed: Jun. 3, 2016

(65) Prior Publication Data

US 2016/0355211 A1 Dec. 8, 2016

(30) Foreign Application Priority Data

Jun. 8, 2015 (JP) .................. 2015-115743

(51) Int. Cl.
*B62D 5/04* (2006.01)
*G05B 21/02* (2006.01)

(52) U.S. Cl.
CPC ......... *B62D 5/0457* (2013.01); *B62D 5/0481* (2013.01); *B62D 5/0484* (2013.01); *G05B 21/02* (2013.01); *G05B 2219/37532* (2013.01)

(58) Field of Classification Search
CPC .. B62D 5/0457; B62D 5/0481; B62D 5/0484; G05B 21/02; G05B 2219/3753
See application file for complete search history.

(56) References Cited

U.S. PATENT DOCUMENTS 4,367,414 A * 1/1983 Miller ................ H02J 13/0079
307/38
5,740,040 A * 4/1998 Kifuku ................ B62D 5/0463
180/446

(Continued)

FOREIGN PATENT DOCUMENTS

JP 2005-159754 6/2005
JP 2007036342 A * 2/2007

(Continued)

OTHER PUBLICATIONS

Texas Instruments Multi-Channel SAE-J2716 (SENT) Decoder Using NHET by Seely, Anthony, 19 pages, Jul. 2010 available online @ http://www.ti.com/lit/an/sprab22/sprab22.pdf: last accessed on Feb. 20, 2017.*

(Continued)

*Primary Examiner* — Rodney A Butler
(74) *Attorney, Agent, or Firm* — Knobbe, Martens, Olson & Bear, LLP

(57) ABSTRACT

A communication system includes a sensor apparatus transmitting a sensor signal including detection information of a detection target as a digital signal and a microcomputer receiving the sensor signal through a signal line and performing a control operation at a predetermined operation cycle based on the sensor signal that is received. The microcomputer transmits, to the sensor apparatus, a synchronization signal which is synchronized with the predetermined operation cycle of the microcomputer. The sensor apparatus transmits the sensor signal at a predetermined constant cycle except when the synchronization signal transmitted by the microcomputer is received. The sensor apparatus changes a transmission timing of the sensor signal corresponding to the synchronization signal when the syn- (Continued)

chronization signal transmitted by the microcomputer is received.

16 Claims, 15 Drawing Sheets

(56) References Cited

U.S. PATENT DOCUMENTS

| | | | | |
|---|---|---|---|---|
| 2008/0159467 A1* | 7/2008 | Kassner | ............... | G01P 3/489 377/20 |
| 2008/0312860 A1* | 12/2008 | Bauerle | ............... | G01D 18/004 702/85 |
| 2010/0114452 A1* | 5/2010 | Bauerle | ............... | F02D 11/106 701/102 |
| 2012/0036922 A1* | 2/2012 | Bauerle | ............... | G01M 15/02 73/114.36 |
| 2012/0093312 A1* | 4/2012 | Gammel | ............... | H04L 9/0631 380/255 |
| 2013/0138266 A1* | 5/2013 | Koike | ............... | A63H 30/04 701/2 |
| 2013/0343472 A1 | 12/2013 | Scherr | | |
| 2015/0066301 A1 | 3/2015 | Kozawa | | |
| 2016/0355211 A1* | 12/2016 | Suzuki | ............... | B62D 5/0457 |

FOREIGN PATENT DOCUMENTS

| | | |
|---|---|---|
| JP | 2011-101487 | 5/2011 |
| JP | 2014-064138 | 4/2014 |
| JP | 2015-080290 | 4/2015 |

OTHER PUBLICATIONS

U.S. Appl. No. 15/178,414, filed Dec. 15, 2016, Taki, et al.
SAE International, Surface Vehicle Information Report, dated Jan. 2010, in 56 pages.

* cited by examiner

FIG. 15A  TWO SENSOR MODE
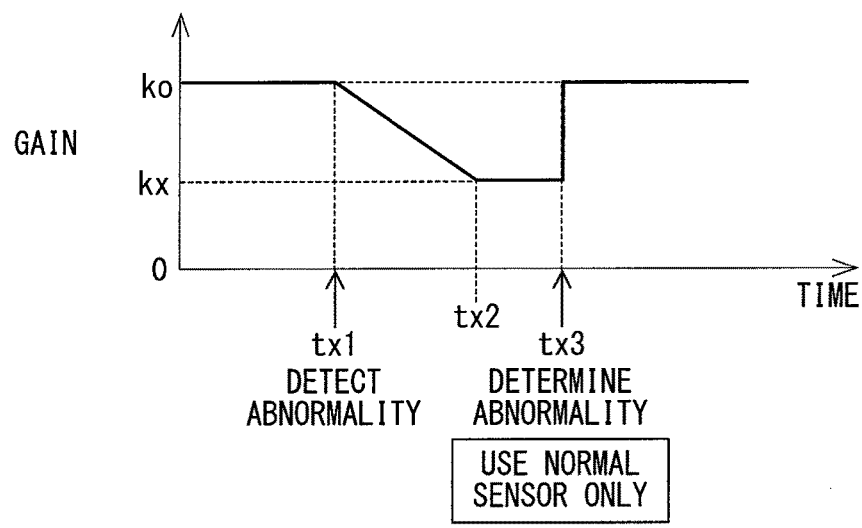
FIG. 15B  ONE SENSOR MODE
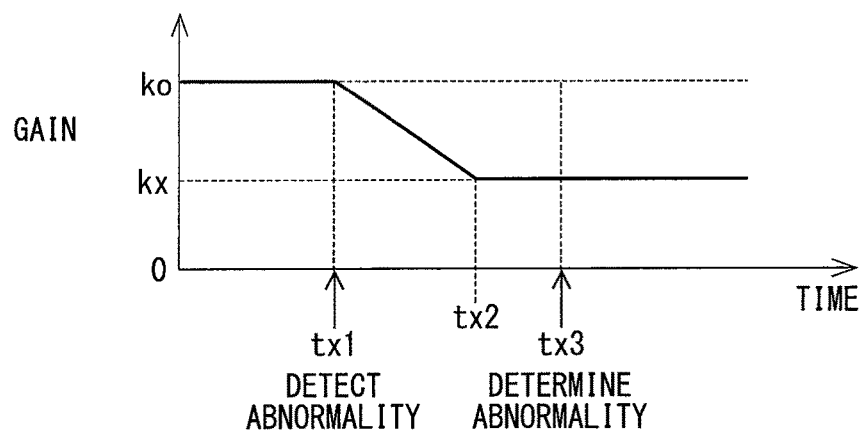

ABOVE ALL, US 10,053,141 B2

COMMUNICATION SYSTEM

CROSS REFERENCE TO RELATED APPLICATION

This application is based on Japanese Patent Application No. 2015-115743 filed on Jun. 8, 2015, the disclosure of which is incorporated herein by reference.

TECHNICAL FIELD

The present disclosure relates to a communication system in which a sensor transmits a detection signal to a control apparatus.

BACKGROUND

In a conventional communication system in which a sensor transmits a detection signal to a control apparatus, the sensor and the control apparatus are configured to operate under the common time information. For example, as disclosed in US 2013/0343472 A1, the control apparatus generates a trigger signal as a request signal, and transmits the trigger signal to the sensor. In response to the request signal, the sensor transmits the sensor signal as a response signal to the control apparatus.

A microcomputer included in the control apparatus receives the sensor signal, which is transmitted from the sensor at a predetermined transmission cycle. Herein, the sensor signal is transmitted from the sensor as a digital signal. In the communication system, after the control apparatus receives the sensor signal, the microcomputer performs a control operation based on the value of the sensor signal at a predetermined operation cycle. Herein, the control operation is provided by arithmetic operation performed by the microcomputer. In this communication system, suppose that a transmission cycle of the sensor is equal to the operation cycle of the microcomputer. In this case, when the sensor and the microcomputer operate based on different timers, the transmission cycle of the sensor may be shifted from the operation cycle of the microcomputer, and a control performance of the microcomputer may be deteriorated.

Regarding the cycle shift between the operation cycle of the microcomputer and the transmission cycle of the sensor signal, US 2013/0343472 A1 discloses a configuration in which the sensor transmits the sensor signal to the microcomputer after the sensor receives a trigger signal transmitted from the microcomputer. With this configuration, the operation cycle of microcomputer and the transmission cycle of the sensor can be synchronized with each other. However, in this configuration, when the transmission of the trigger signal has an abnormality and a transmission failure occurs to the trigger signal, the sensor signal cannot be transmitted from the sensor to the microcomputer. As a result, the microcomputer fails to acquire any information about the detection target, and cannot perform the control operation. Failure of sensor information acquisition may cause a more adverse effect compared with the cycle shift between the operation cycle of the microcomputer and the transmission cycle of the sensor signal.

SUMMARY

In view of the foregoing difficulties, it is an object of the present disclosure to provide a communication system which enables a microcomputer to receive a sensor signal even when an abnormality is occurred in transmitting function of the microcomputer.

According to an aspect of the present disclosure, a communication system includes communication system includes a sensor apparatus transmitting a sensor signal including detection information of a detection target as a digital signal and a microcomputer receiving the sensor signal through a signal line and performing a control operation at a predetermined operation cycle based on the sensor signal that is received. The microcomputer transmits, to the sensor apparatus, a synchronization signal which is synchronized with the predetermined operation cycle of the microcomputer. The sensor apparatus transmits the sensor signal at a predetermined constant cycle except when the synchronization signal transmitted by the microcomputer is received. The sensor apparatus changes a transmission timing of the sensor signal corresponding to the synchronization signal when the synchronization signal transmitted by the microcomputer is received.

With the above communication system, the microcomputer is able to properly receive a sensor signal even when an abnormality is occurred in transmitting function of the microcomputer.

BRIEF DESCRIPTION OF THE DRAWINGS

The above and other objects, features and advantages of the present disclosure will become more apparent from the following detailed description made with reference to the accompanying drawings. In the drawings:

FIG. 15A is a time chart showing a torque command calculation gain change when an abnormality is detected in time stamp by the microcomputer shown in FIG. 14 in two sensor mode;

FIG. 15B is a time chart showing a torque command calculation gain change when an abnormality is detected in time stamp by the microcomputer shown in FIG. 14 in one sensor mode.

DETAILED DESCRIPTION

The following will describe a communication system according to embodiments of the present disclosure with reference to the accompanying drawings. In the present embodiment, the same reference number or symbol is added to the same or equivalent parts, and a description of the similar part will be omitted. In the present disclosure, the term "present embodiment" is used to describe each of the first to eighth embodiments.

First Embodiment

The following will describe a communication system according to the first embodiment of the present disclosure with reference to FIG. 1 to FIG. 4. The communication system according to the first embodiment is applied to an electric power steering apparatus equipped to a vehicle.

Figure 2:
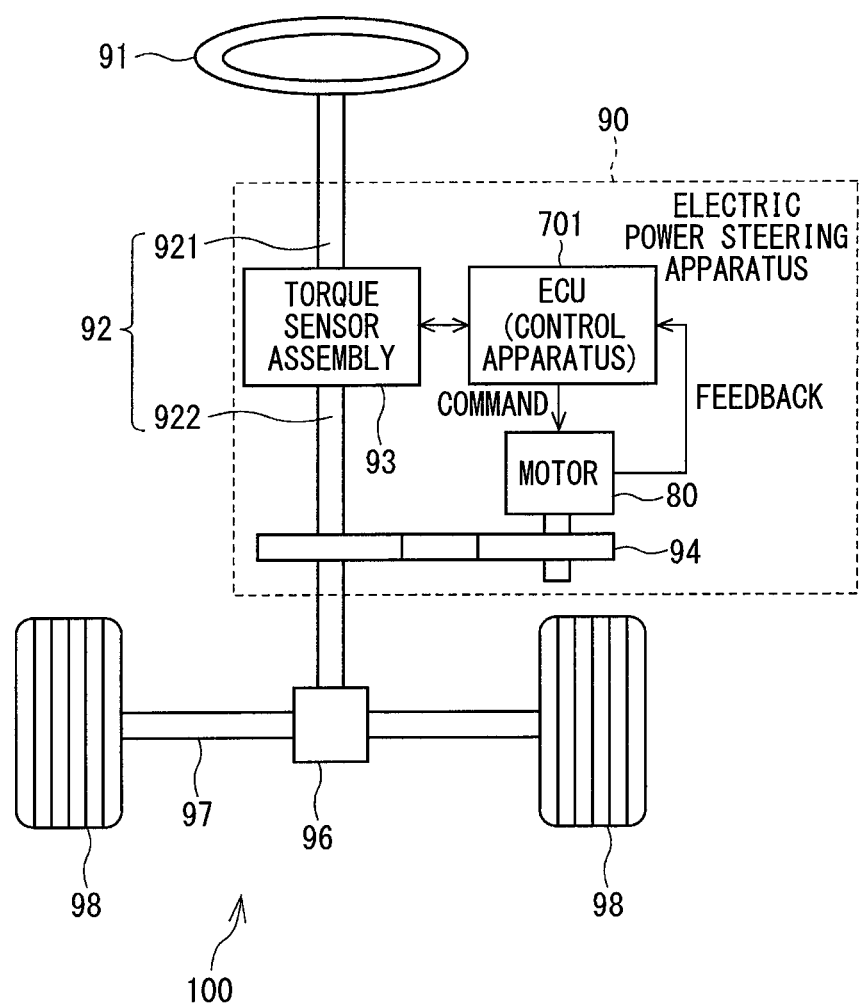
FIG. 2 is a diagram showing a configuration of an electric power steering apparatus to which the communication system according to the present disclosure is applied.

FIG. 2 shows an overall configuration of a steering system 100 including an electric power steering apparatus 90. The electric power steering apparatus 90 shown in FIG. 2 is a column assisted electric power steering apparatus. Alternatively, the electric power steering apparatus 90 may be applied to a rack assisted electric power steering apparatus.

The steering system 100 includes a steering wheel 91, a steering shaft 92, a pinion gear 96, a rack shaft 97, wheels 98, and the electric power steering apparatus 90.

The steering shaft 92 is connected to the steering wheel 91. The pinion gear 96 disposed at an end of the steering shaft 92 is engaged with the rack shaft 97. A pair of wheels 98 is disposed at both ends of the rack shaft 97 through, for example, respective tie rods. When a driver rotates the steering wheel 91, the steering shaft 92 connected to the steering wheel 91 starts to rotate. The rotation motion of the steering shaft 92 is converted to a linear motion of the rack shaft 97 by the pinion gear 96, and a pair of the wheels is steered by an angle corresponding to a displacement amount of the rack shaft 97.

The electric power steering apparatus 90 includes a torque sensor assembly 93, an electronic control unit (ECU) 701, a motor 80, and a speed reduction gear 94. The ECU 701 functions as a control apparatus.

The torque sensor assembly 93 is disposed at a portion between two ends of the steering shaft 92, and detects a steering torque. Specifically, the torque sensor assembly 93 detects the steering torque based on a twist angle of an input side axis 921 close to the steering wheel 91 and a twist angle of an output side axis 922 close to the pinion gear 96. The ECU 701 calculates a torque command indicating an assist torque to be outputted by the motor 80 based on the steering torque acquired from the torque sensor assembly 93. Then, the ECU 701 controls a power supply to the motor 80 so that the motor 80 outputs the torque required by the torque command. The assist torque generated by the motor 80 is transferred to the steering shaft 92 through the speed reduction gear 94.

For example, the ECU 701 controls a power supply to the motor 80 by performing a feedback control to a current supplied to the motor 80 or a torque outputted from the motor 80. The control process performed by the ECU 701 may be achieved by a software process or a hardware process. When the control process is achieved by the software process, a central processing unit (CPU) of the microcomputer 711 executes a preliminarily stored program in a memory to perform the control process. When the control process is achieved by the hardware process, a special purpose electronic circuit may be provided to perform the control process. The ECU 701 may be integrated with the motor 80 as a part of the motor 80.

Figure 1:
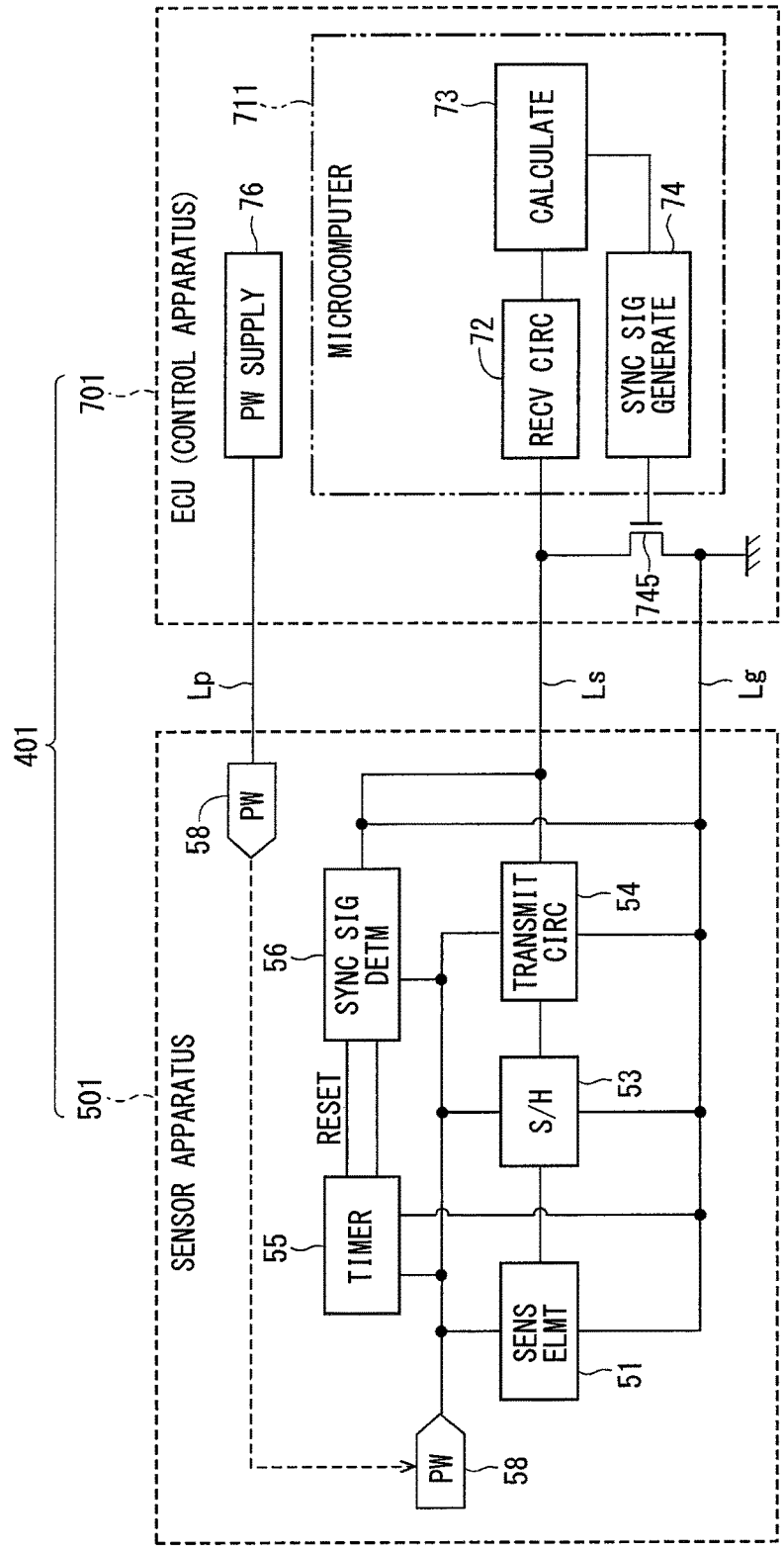
FIG. 1 is a block diagram showing a configuration of a communication system according to a first embodiment to a third embodiment of the present disclosure.

The following will describe a configuration of the communication system according to the first embodiment with reference to FIG. 1.

The communication system 401 includes a sensor apparatus 501 and an ECU 701. The sensor apparatus 501 included in the torque sensor assembly 93 detects a twist angle and transmits a sensor signal. The ECU 701 receives the sensor signal from the sensor apparatus 501. In the present disclosure, the ECU functions as a control apparatus. In the first embodiment, only one sensor apparatus 501 is connected to one ECU 701 through a signal line Ls, a power supply line Lp, and a reference voltage line Lg.

The sensor apparatus 501 includes a sensing element (SENS ELMT) 51 and periphery elements. The sensing element 51 directly detects a physical quantity, and the periphery elements assist detection operation of the sensing element and provide sensor signal output function. For example, when a hall element for detecting a magnetic field change is used as the sensing element 51, a hall IC formed as a package including the hall element corresponds to the sensor apparatus 501. In addition to the sensor apparatus 501, the torque sensor assembly 93 further includes a torsion bar, a multipolar magnet, a magnetic yoke, a magnetism collecting ring and the like. Since a configuration of the torque sensor assembly 93 is well known, a detailed configuration of the torque sensor assembly 93 is not shown in the drawing.

When the sensing element 51 is provided by the hall element, the sensing element 51 detects a magnetic displacement of the magnetism collecting ring corresponding to the twist displacement of the torsion bar, converts the detected magnetic displacement to a voltage signal, and outputs the voltage signal. In this example, the magnetism collecting ring corresponds to a detection target. For example, the twist displacement or a steering torque correlated to the twist displacement corresponds to detection information of the detection target.

In each of the following embodiments, the sensor apparatus 501 includes a sample holding circuit (S/H), a transmission circuit (TRANSMIT CIRC) 54, a timer 55 and a power source (PW) 58. In each of the first embodiment to the third embodiment, the sensor apparatus 501 further includes a synchronization signal determination circuit (SYNC SIG DETM) 56.

The sample holding circuit 53 holds an analog voltage signal outputted from the sensing element 51 for a predetermined number of cycles, and performs an analog to digital convert to the analog voltage signal. The sample holding circuit 53 shown in FIG. 1 has memory ability.

The transmission circuit 54 transmits the sensor signal. Herein, the sensor signal is a digital signal which is converted by the sample holding circuit 53. In the present embodiment, the sensor signal adopts a nibble signal defined under SAE-32716 which is a standard set by Society of Automotive Engineers International. The nibble signal is a signal defined under a Single Edge Nibble Transmission (SENT) protocol. In SENT protocol, a bidirectional communication is enabled using a nibble signal having four bit width as disclosed in JP 2015-46770. As an example of the sensor signal defined under the SENT protocol, data outputted from the main sensor and data outputted from the subsidiary sensor may be transmitted in one sensor signal as shown in FIG. 3.

Figure 3:
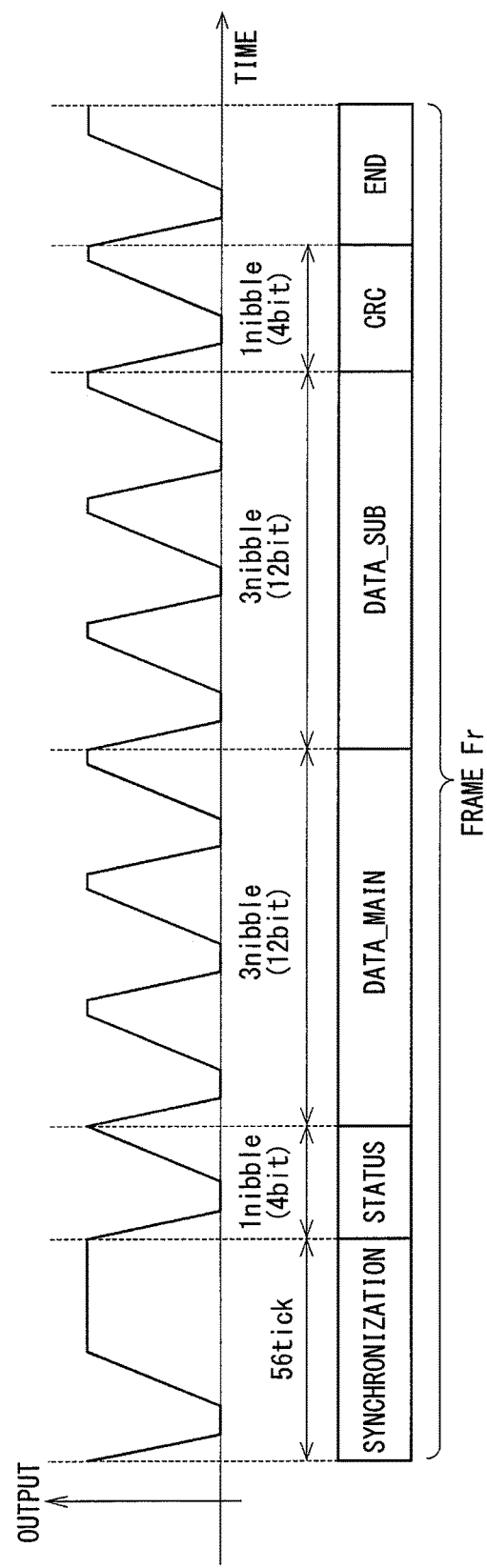
FIG. 3 is a diagram showing an example of a sensor signal used in a single edge nibble transmission (SENT) communication.

The sensor signal shown in FIG. 3 includes a synchronization field, a status field, a main data field, a subsidiary data field, a cyclic redundancy check (CRC) field, and an end field. The data stored in the multiple fields included in the sensor signal are outputted in the described order.

For example, a length of the synchronization signal is 56 ticks. Herein, one tick is defined as 1.5 microsecond. For example, a size of the status field may be one nibble (4 bits), a size of the main data field may be three nibbles (12 bits), a size of the subsidiary data field may be three nibbles (12 bits), and a size of the CRC field may be one nibble (4 bits).

When the size of the data field is three nibbles, twelfth power of two ($2^{12}$=4096) kinds of data values can be transmitted using the three nibble signal. In the time chart of FIG. 4 and the following time charts, the signal including multiple fields shown in FIG. 3 is referred to as a frame (Fr). Although the lengths of data fields in frames may be different from one another, same symbol Fr is used to indicate the frames for simplification.

The timer 55 shown in FIG. 1 determines a transmission start time (transmission timing) of the sensor signal corresponding to a counting value counted by the timer 55. Thus, by adjusting the counting value of the timer 55, the transmission start time of the sensor signal can be changed. In the present embodiment, when the synchronization signal is transmitted from the microcomputer 711, the sensor apparatus 501 changes the transmission start time of the sensor signal corresponding to the synchronization signal transmitted from the microcomputer 711 of the ECU 701.

In each of the first embodiment to the third embodiment, the synchronization signal is provided by a voltage pulse signal, and is transmitted from the ECU 701 to the sensor apparatus 501 through the signal line Ls. The synchronization signal is synchronized with an operation cycle of the microcomputer 711. The synchronization signal synchronizes a transmission cycle of the sensor apparatus 501 with the operation cycle of the microcomputer 711.

The synchronization signal determination circuit 56 determines, based on a voltage of the signal line Ls, whether the synchronization signal is received, and resets a counting value of the timer 55 when determining that the synchronization signal is received. The detailed operation will be described later.

The power source 58 supplies power to each circuit component and each circuit of the sensor apparatus 501. The voltage of the power source 58 is supplied by a power supply circuit 76 of the ECU 701 through the power supply line Lp. Further, each circuit component and each circuit of the sensor apparatus 501 are connected to a common reference voltage line Lg.

The ECU 701 includes the microcomputer 711 and the power supply circuit 76 (PW SUPPLY). In each of the first embodiment to the third embodiment, the ECU 701 further includes a switch 745 connected between the signal line Ls and the reference voltage line Lg. The switch 745 may be provided by a semiconductor switching element.

The microcomputer 711 includes a receiving circuit (RECV CIRC) 72 and a calculation device (CALCULATE) 73. In each of the first embodiment to the third embodiment, the microcomputer 711 further includes a synchronization signal generation unit (SYNC SIG GENERATE) 74. The signal line Ls is connected to the microcomputer 711.

The receiving circuit 72 receives the sensor signal transmitted from the transmission circuit 54 of the sensor apparatus 501 through the signal line Ls. The receiving circuit 72 shown in FIG. 1 has memory ability.

The calculation device 73 corresponds to the CPU of the microcomputer 711. The calculation device 73 performs a control operation at a predetermined operation cycle based on the sensor signal received by the receiving circuit 72. Specifically, the calculation device 73 calculates the torque command indicating the assist torque required to be outputted by the motor 80. The calculation of the torque command will be described in detail in the eighth embodiment of the present disclosure with reference to FIG. 14.

The synchronization signal generation unit 74 generates a synchronization signal which is synchronized with the operation cycle of the calculation device 73. Herein, the synchronization means the start time of the arithmetic operation performed by the calculation device 73 is set at a predetermined interval from synchronization signal generation time. For example, the synchronization signal may be set corresponding to each operation cycle or may be set corresponding to random operation cycle.

In the above example, the synchronization signal generation unit 74 outputs a gate pulse signal to the switch 745 to turn on the switch 745, and decreases a voltage of the signal line Ls for a temporary period of time. In this case, the voltage change may be transmitted to the sensor apparatus 501 as the synchronization signal. As described above, in each of the first embodiment to the third embodiment, bidirectional communication of signals is enabled through the signal line Ls. The power supply circuit 76 supplies the power voltage to the sensor apparatus 501.

Figure 4:
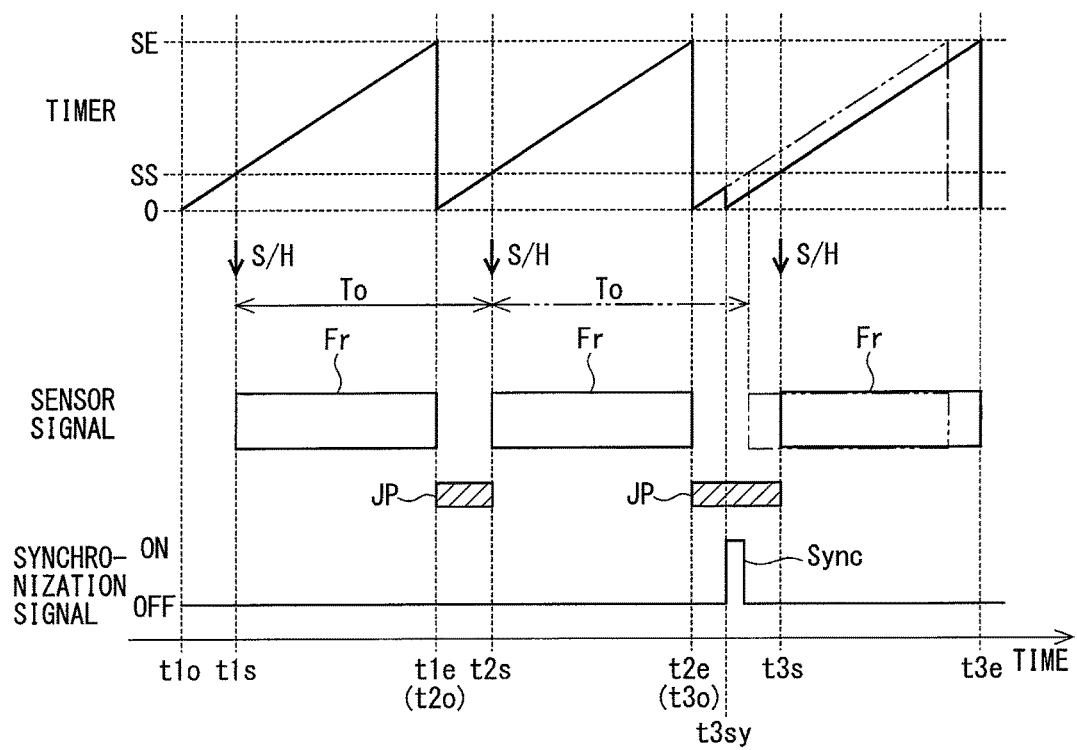
FIG. 4 is a time chart showing a transmission of a sensor signal in the communication system according to the first embodiment of the present disclosure.

The following will describe a transmission of the sensor signal by the sensor apparatus 501 according to the first embodiment. In FIG. 4, the horizontal axis indicates time. The vertical axis indicates a counting value of the timer 55, the sensor signal transmitted from the transmission circuit 54 to the microcomputer 711, and the synchronization signal outputted from the microcomputer 711 in an up to down direction.

The counting value of the timer 55 starts with a value of zero. After exceeding a predetermined start value of SS, the counting value ends with a predetermined end value of SE. The transmission circuit 54 starts the transmission of the sensor signal when the counting value of the timer 55 reaches the start value of SS, and ends the transmission of the sensor signal when the counting value reaches the end value of SE. When the counting value reaches the end value of SE, the counting value is reset to zero.

As shown in FIG. 4, the counting value increases from zero at a time t1o. When the counting value increases to the start value of SS at a time t1s, the detection value of the sensing element 51 is sampled and held, and then analog to digital conversion is carried out to the sampled detection value. The transmission circuit 54 starts transmitting the digital data which is obtained by the analog to digital conversion as a sensor signal. During a period having the start time of t1s and end time of t1e, the first sensor signal is transmitted to the microcomputer 711. Herein, the end time of t1e is a time at which the counting value increases to the end value SE, and the first end time t1e is equal to a zero point t2o of the second sensor signal. Similarly, during a period having the start time of t2s and end time of t2e, the second sensor signal is transmitted to the microcomputer 711.

During the counting up of the counting value in the first transmission and the second transmission, the sensor apparatus 501 does not receive the synchronization signal from the microcomputer 711. When the sensor apparatus 501 does not receive the synchronization signal from the microcomputer 711, the transmission cycle from a transmission start time of the last sensor signal to a transmission start time of the current sensor signal is maintained at a constant value based on an internal clock of the sensor apparatus 501. This constant cycle is referred to as a normal transmission cycle To.

In the third counting up, after the counting value starts to increase from zero at the time t3o, the microcomputer 711 outputs a synchronization signal Sync at a time t3sy before the counting value reaches the start value SS. The synchronization signal Sync is transmitted to the sensor apparatus 501 through the signal line Ls.

The synchronization signal determination circuit 56 of the sensor apparatus 501 determines a reception of the synchronization signal Sync. For example, when determining the reception of the synchronization signal, the synchronization signal determination circuit 56 may determine whether the voltage of the signal line Ls becomes to the reference voltage during a determination period JR Alternatively, the synchronization signal determination circuit 56 may determine whether the voltage of the signal line Ls becomes to the reference voltage during a period which is set longer than one transmission cycle, that is, a transmission period of one sensor signal.

When determining the reception of the synchronization signal Sync at the time t3sy by the synchronization signal determination circuit 56, the counting value of the timer 55 is reset and the timer 55 recounts a counting value from zero at time t3sy. As a result, the third sensor signal is transmitted with a small delay compared with a case where the synchronization signal is not received. With this configuration, a cycle shift between the transmission cycle of the sensor apparatus 501 and the operation cycle of the microcomputer 711 can be corrected.

The microcomputer 711 has no need to output the synchronization signal corresponding to each transmission cycle of the sensor signal. The synchronization signal may be outputted at a time interval which is equal to a predetermined number of the transmission cycles of the sensor signal. Herein, the time interval may be set corresponding to a time period during which the cycle shift between the transmission cycle of the sensor apparatus 501 and the operation cycle of the microcomputer 711 starts to adversely affect the control performance of the control apparatus 701.

Suppose that a failure occurs to a transmission of the synchronization signal to the sensor apparatus 501 after the synchronization signal is generated by the microcomputer 711. In this case, as shown by a two-dot chain line in FIG. 4, the third counting value is not reset at time t3sy and increases similar to the first transmission and the second transmission of the sensor signal. Thus, the third sensor signal is transmitted at the normal transmission cycle To following the second sensor signal.

As disclosed in US 2013/0343472 A1, after receiving the trigger signal transmitted from the microcomputer, the sensor transmits the sensor signal to the microcomputer. However, in this configuration, when the transmission of the trigger signal has an abnormality and a transmission failure occurs to the trigger signal, the sensor signal cannot be transmitted from the sensor to the microcomputer. As a result, the microcomputer may fail to acquire any information about the detection target, and cannot perform the control operation.

In the communication system 401 according to the first embodiment, the sensor apparatus 501 transmits the sensor signal to the microcomputer 711 at predetermined normal transmission cycle when the synchronization signal is not transmitted from the microcomputer 711. That is, the sensor apparatus 501 transmits the sensor signal to the microcomputer 711 regardless of presence of the synchronization signal. Thus, even when the transmission of the synchronization signal Sync from the microcomputer 711 has an abnormality and a transmission failure occurs to the synchronization signal Sync, the microcomputer 711 is able to receive the sensor signal transmitted by the sensor apparatus 501 at a predetermined transmission cycle. After receiving the sensor signal, the microcomputer 711 performs a control operation based on the received sensor signal.

In this configuration, although the cycle shift cannot be corrected, a failure of the control operation caused by the transmission failure of the synchronization signal as disclosed in US 2013/0343472 A1 can be avoided. For example, when the communication system 401 is applied to the electric power steering apparatus 90, a complete failure of the torque assist function can be avoided.

When the synchronization signal is transmitted without any failure or abnormality, the sensor apparatus changes the transmission timing of the sensor signal corresponding to the synchronization signal. Thus, the cycle shift between the operation cycle of the microcomputer and the transmission cycle of the sensor apparatus can be corrected, an the control performance is improved.

Second Embodiment

The communication system according to the second embodiment has a configuration similar to the first embodiment as shown in FIG. 1. The following will describe an operation of the communication system according to the second embodiment with reference to the time chart shown in FIG. 5.

In the second embodiment, corresponding to a time interval between two pulse signals (two synchronization signals), the start value SS and end value SE defining the transmission of the sensor signal are adjusted. With this configuration, the transmission timing of the sensor signal can be changed.

Figure 5:
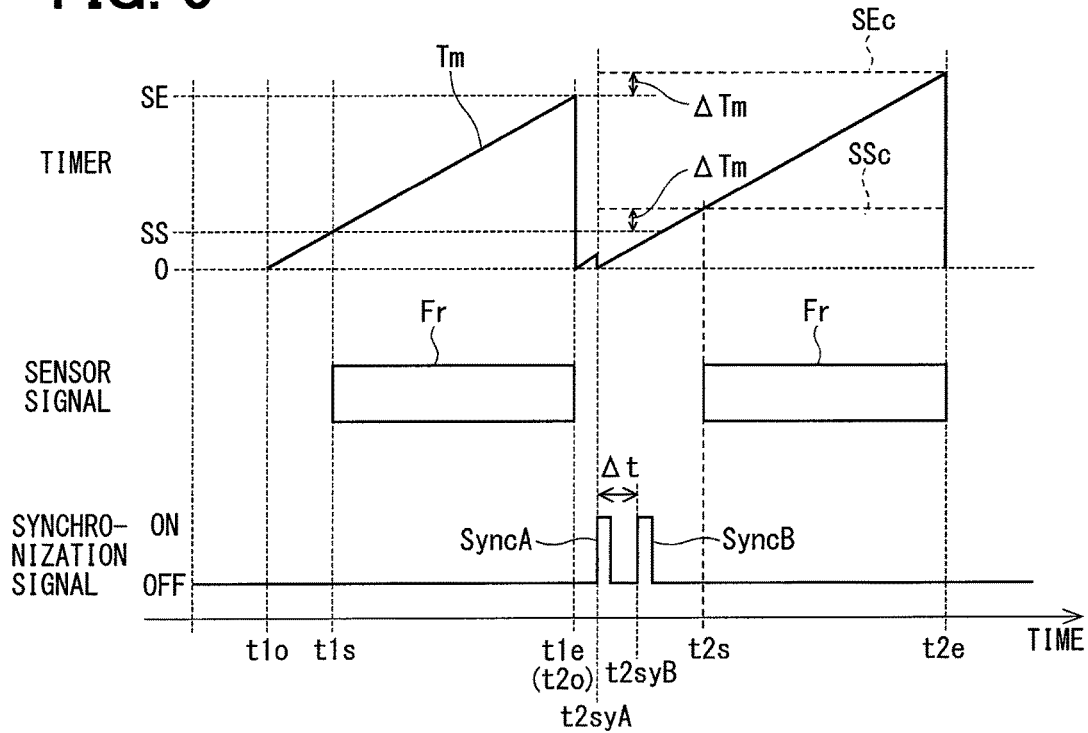
FIG. 5 is a time chart showing a transmission of a sensor signal in the communication system according to the second embodiment of the present disclosure.

In the example shown in FIG. 5, a first synchronization signal SyncA is transmitted from the microcomputer 711 at a time t2syA, and the timer 55 is reset and starts counting of the counting value from zero at the time t2syA. Then, at a time t2syB during the counting up by the timer 55, a second synchronization signal SyncB is transmitted from the microcomputer 711. Based on the two synchronization signals SyncA and SyncB, each of the start value SS and the end value SE is shifted by a value ΔTm. Herein, the shift value ΔTm is set corresponding to a time interval Δt between the first synchronization signal SyncA and the second synchronization signal SyncB. Thus, a corrected start value SSc and a corrected end value SEc are obtained. As a result, the sensor signal is transmitted during a period from the start time t2s at which the counting value reaches the corrected start value SSc to the end time t2e at which the counting value reaches the corrected end value SEc.

Similar to the first embodiment, in the second embodiment, the transmission timing of the sensor signal is changed in order to correct the transmission cycle shift caused by the timer 55. The synchronization signals SyncA and SyncB may be outputted corresponding to each transmission cycle or at a predetermined time interval equal to a predetermined number of transmission cycles of the sensor signal, similar to the first embodiment. Further, when a transmission abnormality occurs to the synchronization signals SyncA or SyncB, the sensor apparatus 501 transmits the sensor signal at the normal transmission cycle To. Thus, the microcomputer 711 can receive the sensor signal and perform the control operation even when a transmission abnormality occurs to the synchronization signals.

Third Embodiment

Figure 6:
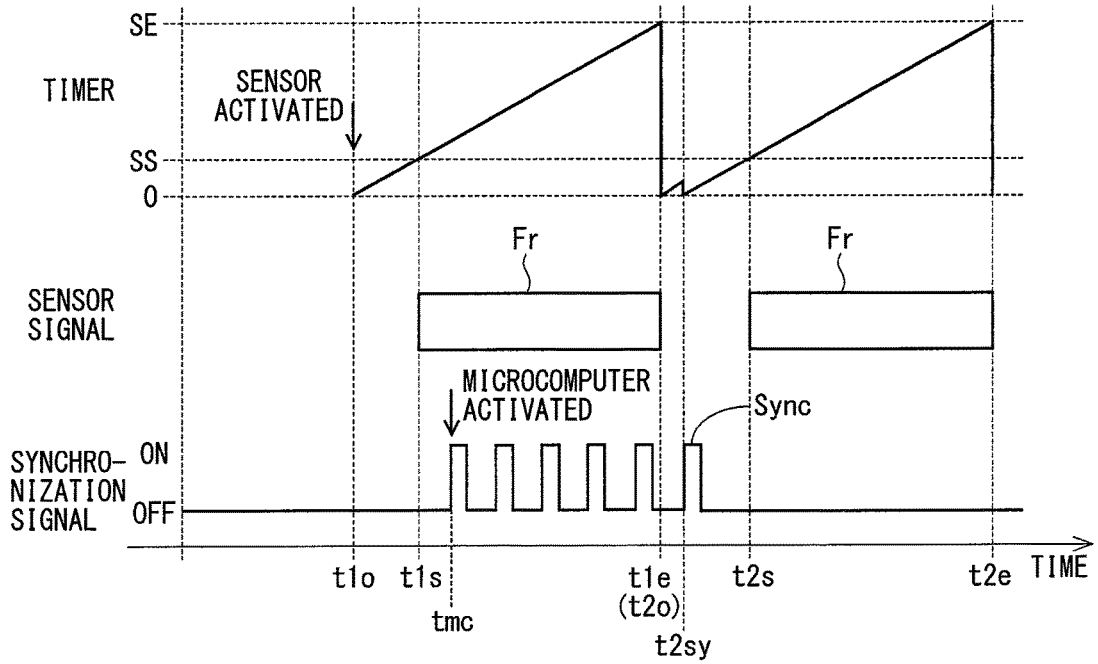
FIG. 6 is a time chart showing a transmission of a sensor signal in the communication system according to the third embodiment of the present disclosure.

The communication system according to the third embodiment has a configuration similar to the first embodiment as shown in FIG. 1. The following will describe an operation of the communication system according to the third embodiment with reference to the time chart shown in FIG. 6.

The microcomputer 711 is activated at a time tmc, which is after a transmission start time t1s of the first sensor signal. The transmission start time t1s is posterior to the activation time no of the sensor apparatus 501. After activated, the microcomputer 711 continuously outputs the synchronization signal until a time point after the end time t1e of the first sensor signal. In this case, continuous output of the synchronization signals means the pulse signal is repeatedly outputted by the microcomputer 711.

The counting value of the timer 55 is reset based on the first synchronization signal Sync outputted posterior to the end time t1e of the first sensor signal, and the transmission timing of the sensor signal is changed.

After the change of the sensor signal transmission timing, the microcomputer 711 may continuously output the synchronization signal Sync until being powered off. As another example, the microcomputer 711 may switch between a first extended cycle during which the synchronization signal is continuously outputted and a second extended cycle during which the synchronization signal is not outputted. Herein, each of the first and second extended cycles may be set several times of the transmission cycle.

As described above, in the third embodiment, after the activation of the microcomputer 711, the microcomputer 711 continuously outputs the synchronization signal Sync until a time point set posterior to a transmission end time of the first sensor signal transmitted by the sensor apparatus 501. With this configuration, the output of the synchronization signal Sync from the microcomputer 711 can be stabilized. Further, the communication system according to the third embodiment provides advantages similar to the first embodiment and the second embodiment.

Fourth Embodiment

Figure 7:
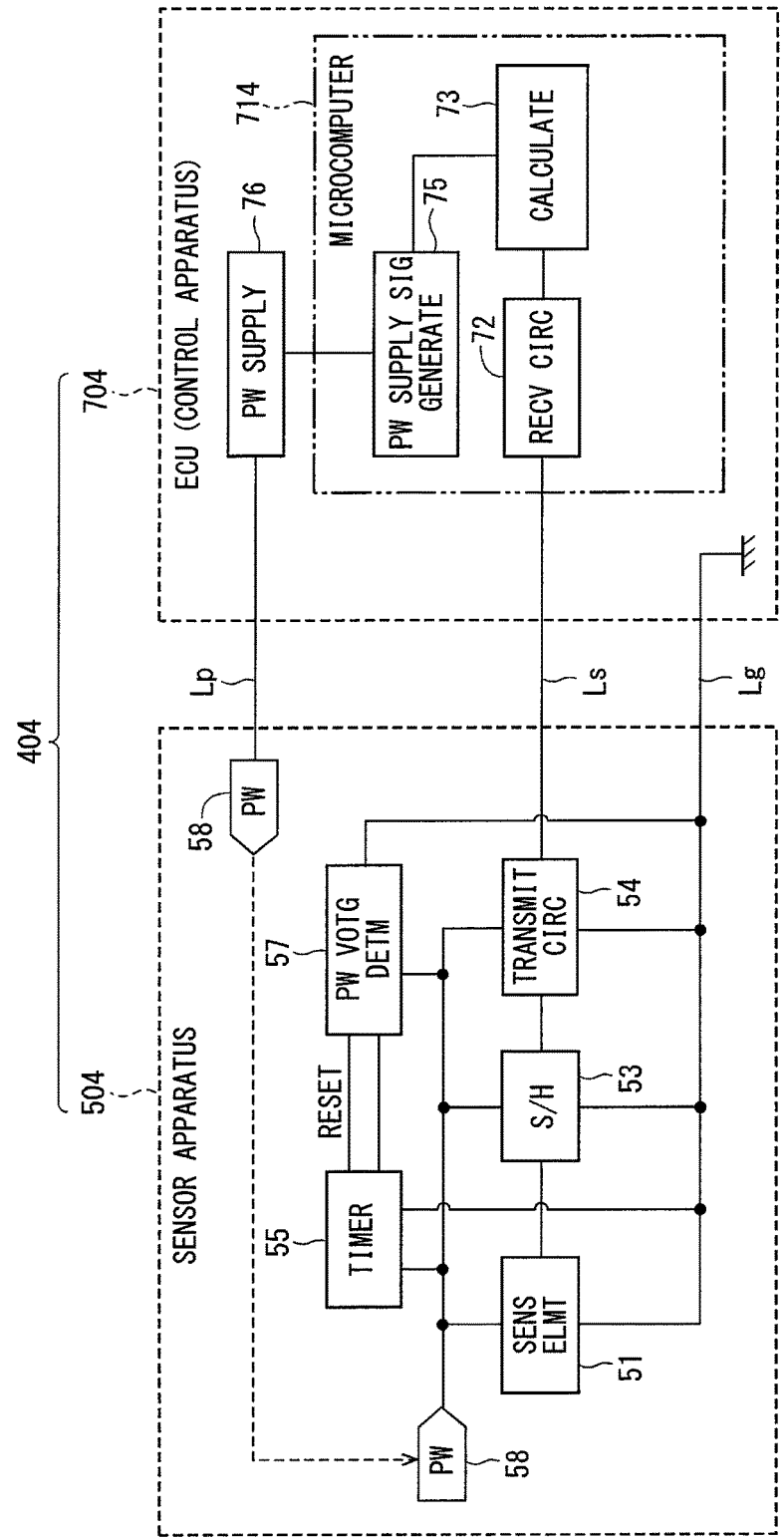
FIG. 7 is a block diagram showing a configuration of a communication system according to a fourth embodiment of the present disclosure.
Figure 8:
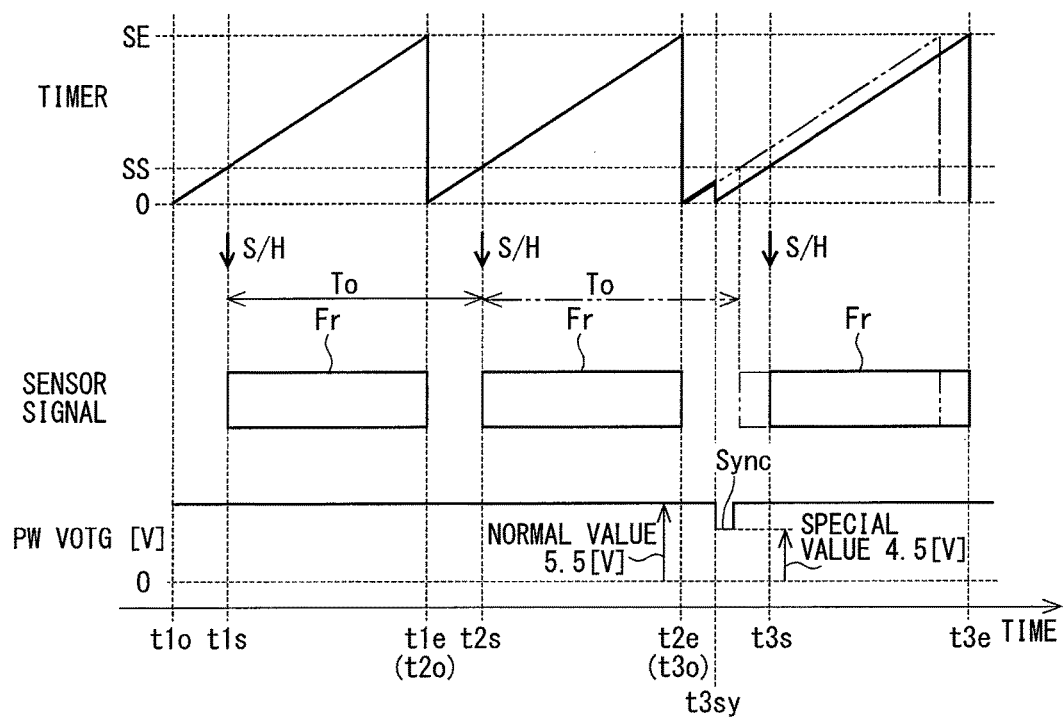
FIG. 8 is a time chart showing a transmission of a sensor signal in the communication system shown in FIG. 7.

The following will describe a communication system according to the fourth embodiment of the present disclosure with reference to FIG. 7 and FIG. 8.

The communication system 404 according to the fourth embodiment includes a sensor apparatus 504 and an ECU 704. Compared with the sensor apparatus 501 according to the first embodiment, the sensor apparatus 504 in the present embodiment includes a power voltage determination circuit (PW VOTG DETM) 57 instead of the synchronization signal determination circuit 56. Compared with the microcomputer 711 according to the first embodiment, the microcomputer 714 of the ECU 704 in the present embodiment includes a power supply signal generation unit (PW SUPPLY SIG GENERATE) 75 instead of the synchronization signal generation unit 74. Further, in the present embodiment, the ECU 704 does not include the switch 745.

In the configuration according to the fourth embodiment, the power voltage supplied from the power supply circuit 76 to the sensor apparatus 504 has a normal value and a special value, and the power voltage is switchable between the normal value and the special value. The normal value and the special value are set under a condition that (i) the values do not adversely affect the operation of the sensor apparatus 504 and (ii) the voltage levels of the two values are properly distinguished from one another. For example, the normal value may be set to 5.5 volt and the special value may be set to 4.5 volt as shown in FIG. 8.

The power supply signal generation unit 75 outputs a command to the power supply circuit 76 to select the special value when outputting the synchronization signal. Except the output duration of the synchronization signal, the power supply signal generation unit 75 outputs a command to the power supply circuit 76 to select the normal value. As described above, the synchronization signal is outputted by switching the power voltage between the normal value and the special value.

The power voltage determination circuit 57 of the sensor apparatus 504 detects the supplied power voltage. When the supplied power voltage is equal to the special value, the power voltage determination circuit 57 determines that the synchronization signal is received. When the power voltage determination circuit 57 determines the reception of the synchronization signal, the timer 55 resets the counting value.

As shown in FIG. 8, in the communication system 404 according to the fourth embodiment, the transmission start time of the sensor signal can be changed corresponding to the synchronization signal similar to the first embodiment. Further, when a transmission failure occurs to the synchronization signal, as shown by a two-dot chain line, the sensor signal is transmitted at the normal transmission cycle To. Thus, the present embodiment provides advantages similar to the first embodiment.

Fifth Embodiment

Figure 9:
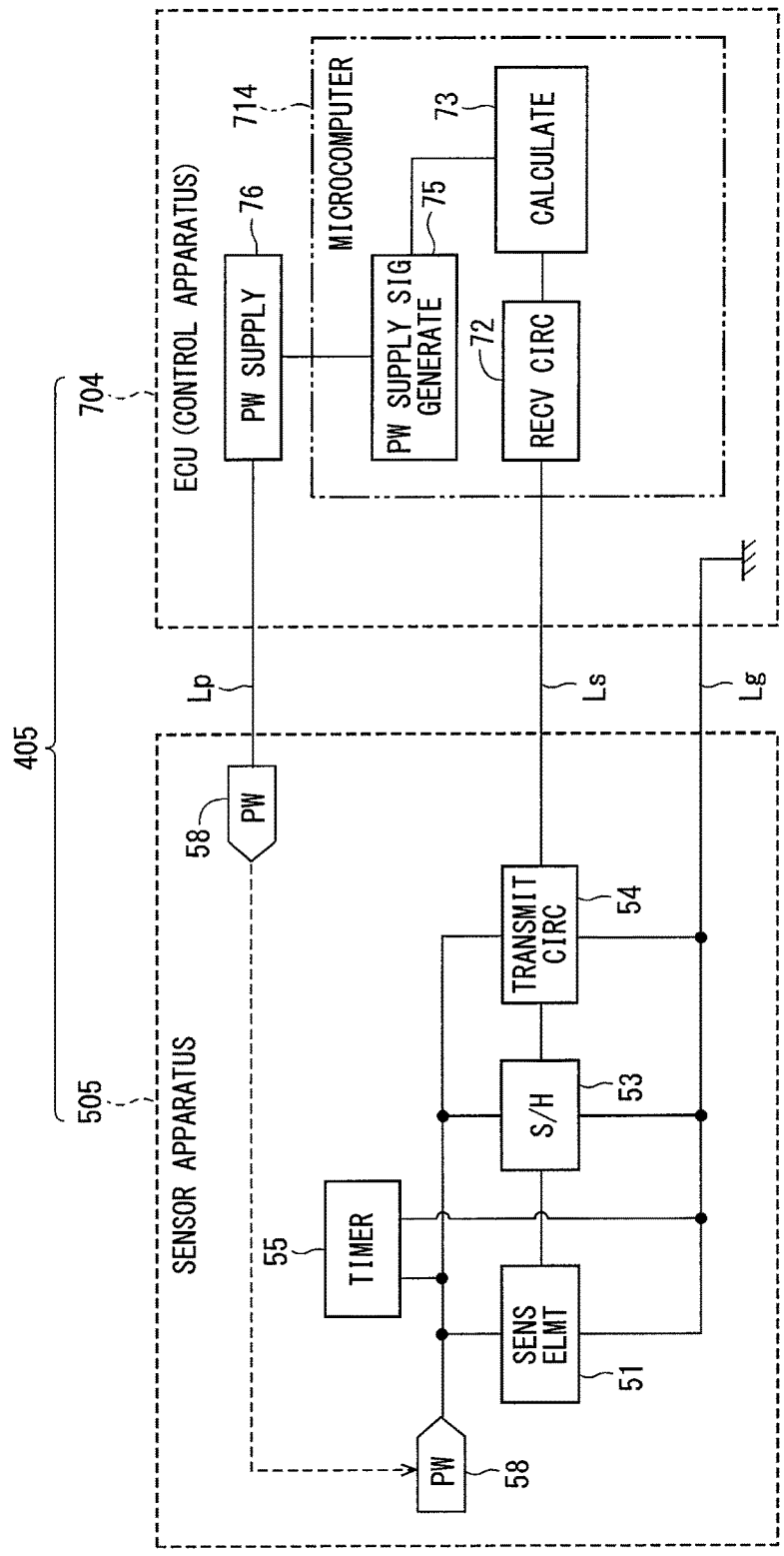
FIG. 9 is a block diagram showing a configuration of a communication system according to a fifth embodiment of the present disclosure.
Figure 10:
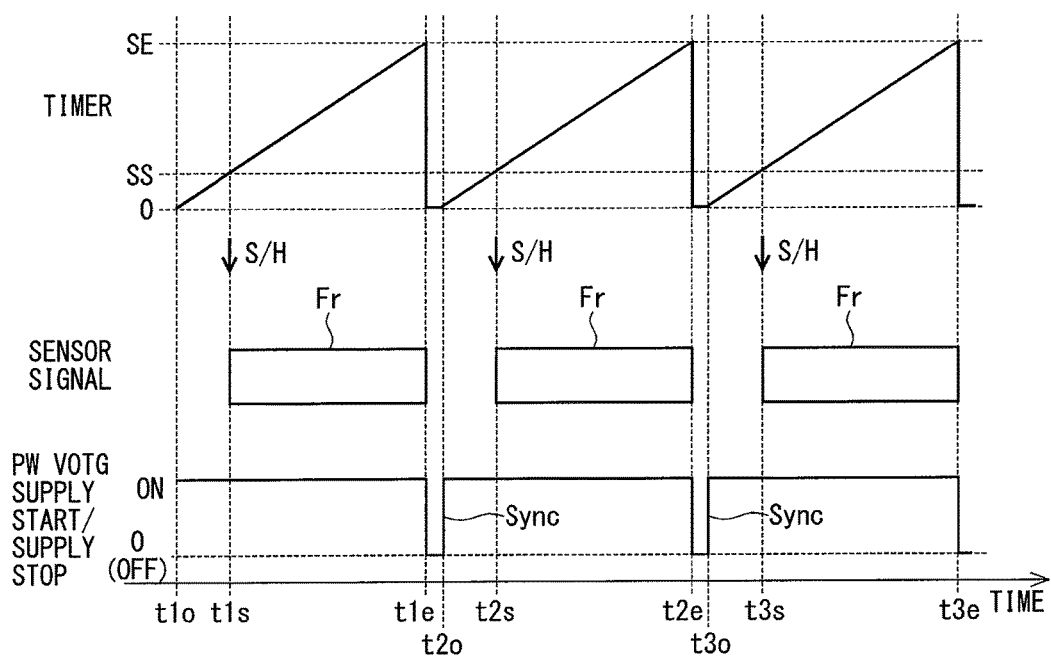
FIG. 10 is a time chart showing a transmission of a sensor signal in the communication system shown in FIG. 9.

The following will describe a communication system according to the fifth embodiment of the present disclosure with reference to FIG. 9 and FIG. 10.

The communication system 405 according to the fifth embodiment includes a sensor apparatus 505 and an ECU 704. Compared with the sensor apparatus 504 according to the fourth embodiment, the sensor apparatus 505 in the present embodiment does not include the power voltage determination circuit 57. The ECU 704 has a configuration similar to the ECU 704 in the fourth embodiment.

In the fifth embodiment, a switch between power supply start and power supply stop of the power voltage from the power supply circuit 76 to the sensor apparatus 505 is used as the synchronization signal Sync. That is, the present embodiment corresponds to a case where the special value described in the fourth embodiment is set to zero volt.

As shown in FIG. 10, when the power supply is stopped, the timer 55 also stops operation. Thus, based on a command outputted from the power supply signal generation unit 75, a restart time of the power supply after the power supply stop can be adjusted and the transmission start time of the sensor signal can be changed.

The communication system according to the present embodiment provides advantages similar to the first embodiment.

Sixth Embodiment

Figure 11:
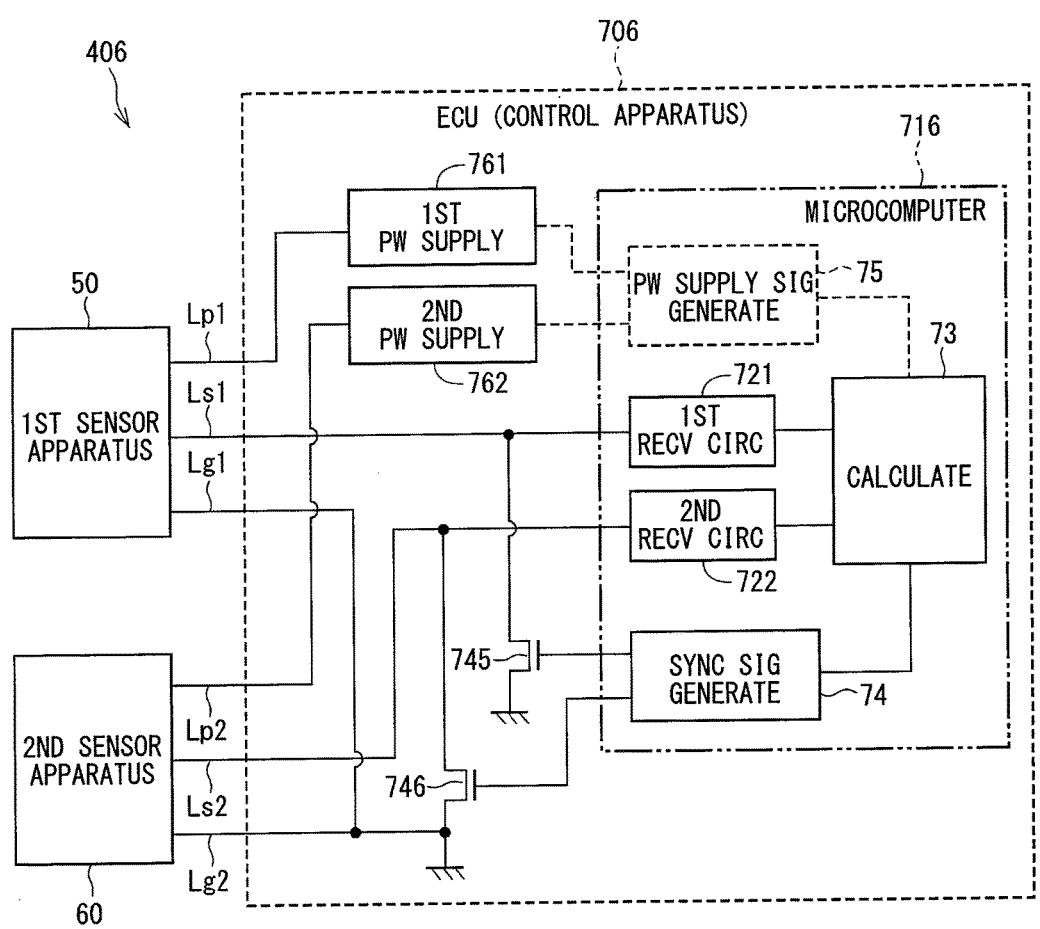
FIG. 11 is a block diagram showing a configuration of a communication system according to a sixth embodiment and a seventh embodiment of the present disclosure.
Figure 12:
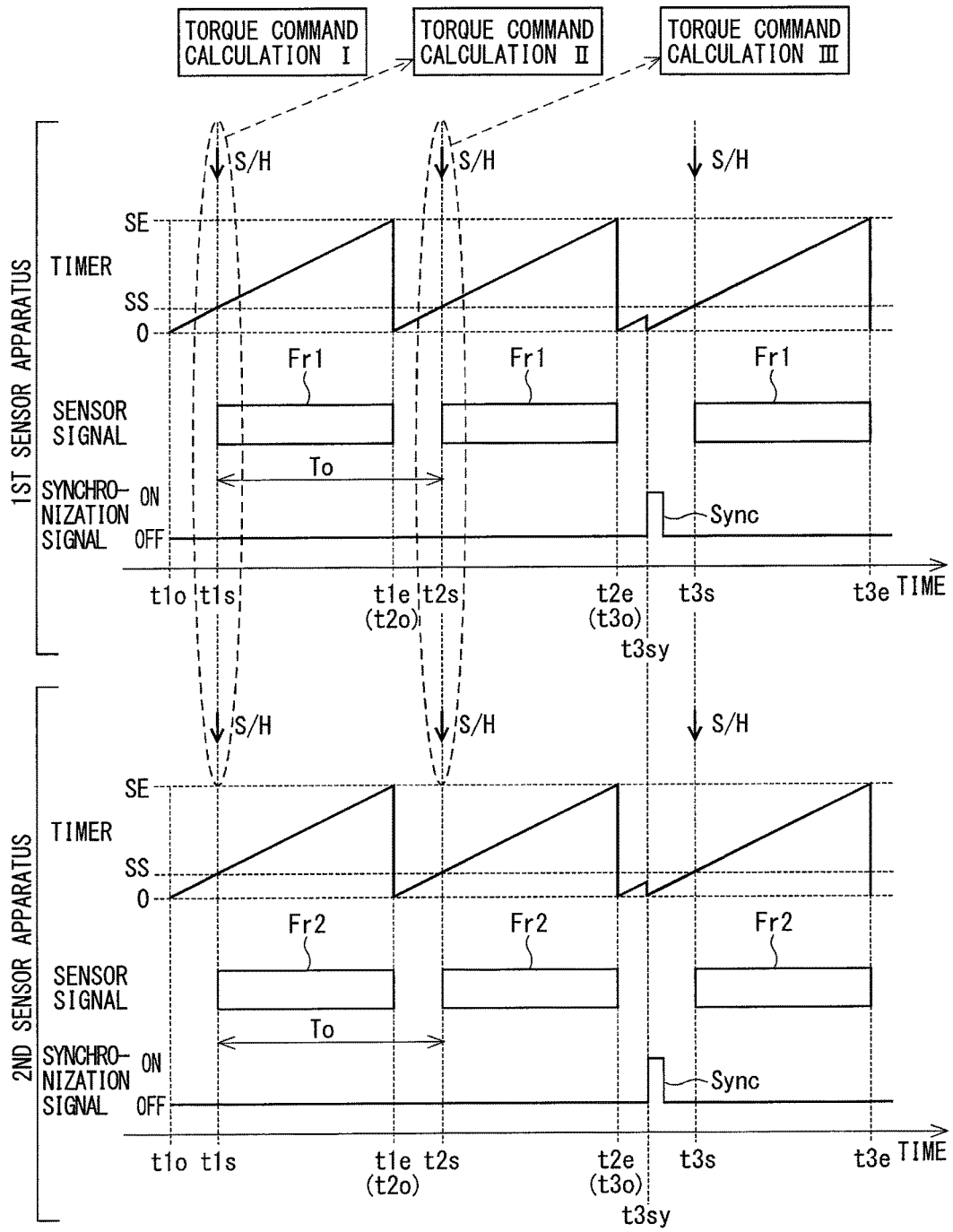
FIG. 12 is a time chart showing a transmission of a sensor signal in the communication system according to the sixth embodiment of the present disclosure.

The following will describe a communication system according to the sixth embodiment of the present disclosure with reference to FIG. 11 and FIG. 12.

The communication system 406 shown in FIG. 11 includes multiple sensor apparatus and one ECU 706. The multiple sensor apparatus includes a first sensor apparatus 50 and a second sensor apparatus 60. The first sensor apparatus 50 is connected to the ECU 706 through a signal line Ls1, a power line Lp1, and a reference voltage line Lg1. The second sensor apparatus 60 is connected to the same ECU 706 through a signal line Ls2, a power line Lp2, and a reference voltage line Lg2. The first sensor apparatus 50 and the second sensor apparatus 60 have substantially identical configurations. Each of the sensor apparatus 50, 60 is disposed in redundant manner to one another with consideration of a malfunction occurred to one of the sensor apparatus 50, 60 for securing a detection function.

The microcomputer 716 of the ECU 706 includes a first receiving circuit (1ST RECV CIRC) 721 and a second receiving circuit (2ND RECV CIRC) 722. The first receiving circuit 721 receives the sensor signal transmitted from the first sensor apparatus 50 through the signal line Ls1, and the second receiving circuit 722 receives the sensor signal transmitted from the second sensor apparatus 60 through the signal line Ls2. The calculation device 73 of the microcomputer 716 performs a control operation at a predetermined operation cycle based on the sensor signals received by the first receiving circuit 721 and the second receiving circuit 722.

The first power supply circuit (1ST PW SUPPLY) 761 supplies power to the first sensor apparatus 50 through the power supply line Lp1, and the second power supply circuit (2ND PW SUPPLY) 762 supplies power to the second sensor apparatus 60 through the power supply line Lp2. The two reference voltage lines Lg1 and Lg2 are connected to a common reference voltage.

The first sensor apparatus 50 and the second sensor apparatus 60 may have a similar configuration with the sensor apparatus described in the first embodiment to the fifth embodiment. When the configurations according to the first embodiment to the fifth embodiment are applied, the configuration ECU 706 is changed corresponding to specific configuration described in each embodiment. In FIG. 11, the configuration of the sensor apparatus 706 corresponding to the first embodiment to the third embodiment, that is, the synchronization signal generation unit 74 and the switch 745 are shown by solid lines. Further, the configuration of the sensor apparatus 706 corresponding to the fourth embodiment and the fifth embodiment, that is, the power supply signal generation unit 75 is shown by dashed lines.

In the configuration similar to the first embodiment to the third embodiment, the synchronization signal generation unit 74 controls the output time of the gate pulse signal to the switches 745 and 746, and transmits synchronization signals to the first sensor apparatus 50 and the second sensor apparatus 60, respectively. In this configuration, the two power supply circuits 761 and 762 may be integrated as one power supply circuit.

In the configuration similar to the fourth embodiment and the fifth embodiment, the power supply signal generation unit 75 controls a switch time of the power voltage between the normal value and the special value or controls a switch time of the power supply start and the power supply stop. In this case, the power supply signal generation unit 75 outputs synchronization signals to the first sensor apparatus 50 and the second sensor apparatus 60, respectively.

The following will describe a relationship between the transmission timing of the sensor signal by the first sensor apparatus 50 and the transmission timing of the sensor signal by the second sensor apparatus 60. In FIG. 12, the frame of the sensor signal transmitted by the first sensor apparatus 50 is indicated as Fr1, and the frame of the sensor signal transmitted by the second sensor apparatus 60 is indicated as Fr2.

In the sixth embodiment, as shown in FIG. 12, the first sensor apparatus 50 and the second sensor apparatus 60 transmit the sensor signals at the same time. Further, the synchronization signal Sync from the microcomputer 716 is transmitted to the first sensor apparatus 50 and the second sensor apparatus 60 at the same time.

The detection value sampled and held at the time t1$s$ is reflected in the torque command calculation II of the calculation device 73. The detection value sampled and held at the time t2$s$ is reflected in the torque command calculation III of the calculation device 73. The communication system according to the present embodiment provides advantages similar to the first embodiment.

Seventh Embodiment

Figure 13:
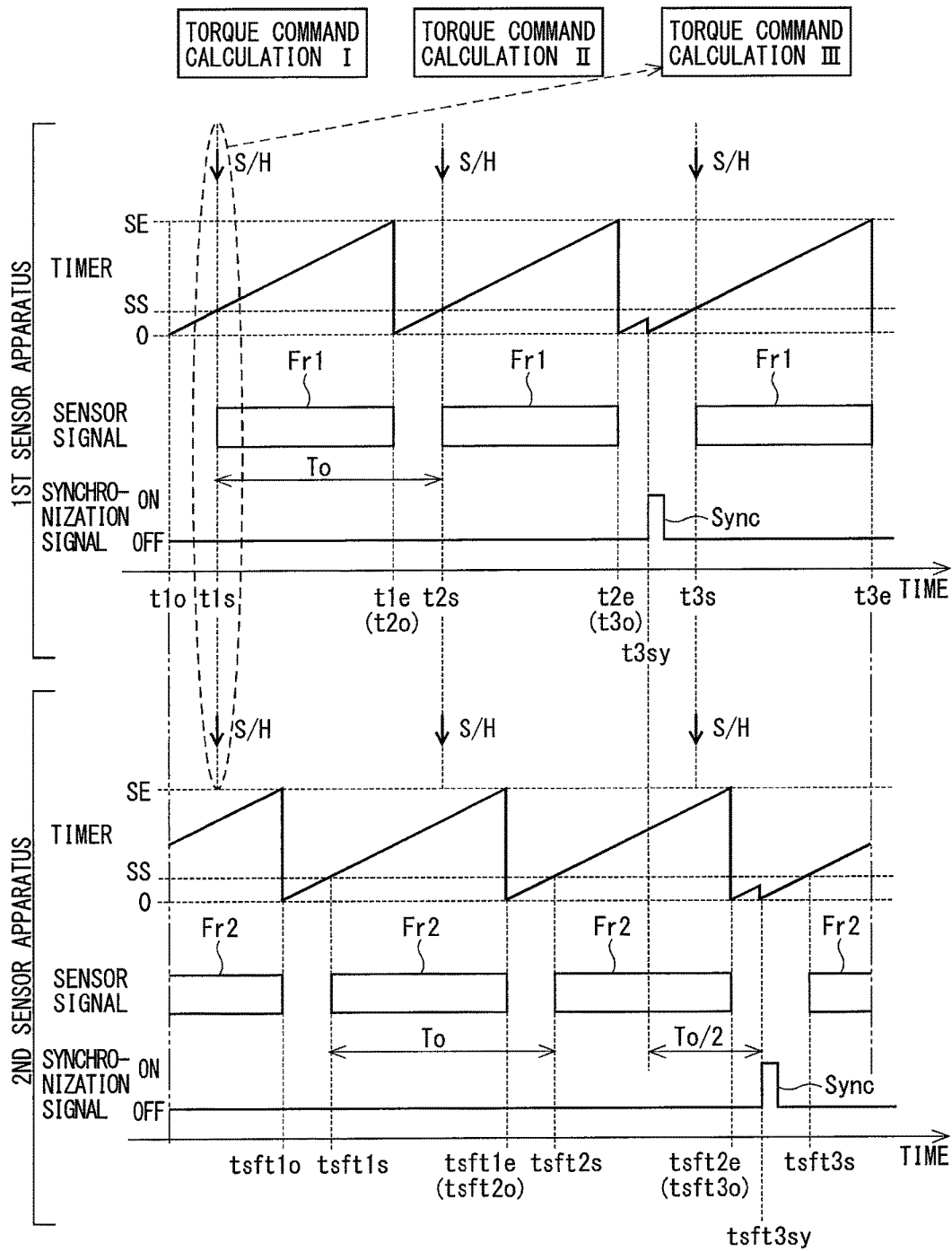
FIG. 13 is a time chart showing a transmission of a sensor signal in the communication system according to the seventh embodiment of the present disclosure.

The following will describe a communication system according to the seventh embodiment of the present disclosure with reference to FIG. 13. The communication system according to the seventh embodiment has a configuration similar to the sixth embodiment.

The following will describe a relationship between the transmission timing of the sensor signal by the first sensor apparatus 50 and the transmission timing of the sensor signal by the second sensor apparatus 60 in the seventh embodiment with reference to FIG. 13. In FIG. 13, the frame of the sensor signal transmitted by the first sensor apparatus 50 is indicated as Fr1, and the frame of the sensor signal transmitted by the second sensor apparatus 60 is indicated as Fr2.

In the seventh embodiment, the transmission timing of the sensor signal by the first sensor apparatus 50 is set different from the transmission timing of the sensor signal by the second sensor apparatus 60. That is, one transmission timing is shifted by a predetermined period of time from the remaining transmission timing. In FIG. 13, the shifted time is indicated by "tsft" instead of "t" shown in FIG. 12. As shown in FIG. 13, the synchronization signal from the microcomputer 716 is transmitted to the first sensor apparatus 50 at a time t3$sy$, and is transmitted to the second sensor apparatus 60 at a time tsft3$sy$. A time difference between the transmission timing t3$sy$ and tsft3$sy$ is set to a half of the normal transmission cycle To, that is, set to To/2.

The detection value sampled and held at the time t1$s$ is reflected in the torque command calculation III of the calculation device 73.

When generating the synchronization signal using the ECU having the configuration of the first embodiment shown in FIG. 10, the power supply timings to the first sensor apparatus 50 and the second sensor apparatus 60 by the respective power supply circuits 761 and 762 may be set different from one another. With this configuration, the transmission timing of the sensor signal from the first sensor apparatus 50 to the microcomputer 716 can be shifted from the transmission timing of the sensor signal from the second sensor apparatus 60 to the microcomputer 716. The communication system according to the present embodiment provides advantages similar to the first embodiment.

Eighth Embodiment

Figure 14:
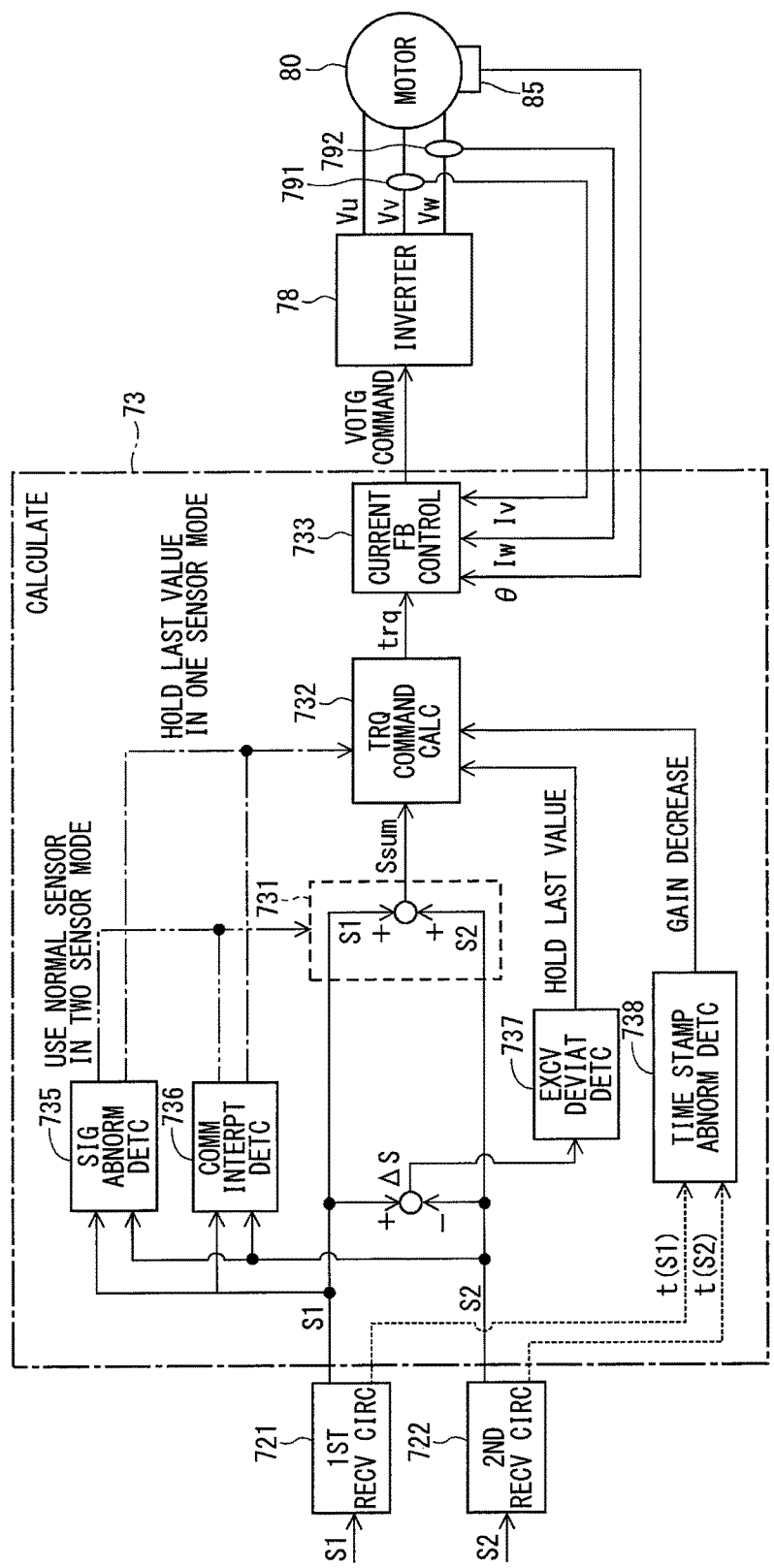
FIG. 14 is a block diagram showing a configuration of a microcomputer according to an eighth embodiment of the present disclosure.

The following will describe a communication system according to the eighth embodiment of the present disclosure with reference to FIG. 14 to FIG. 15B.

In the eighth embodiment, the calculation device 73 detects an abnormality in the sensor signal, and performs a predetermined process in response to the detection of the abnormality. The eighth embodiment can be applied to a communication system including one or more sensor apparatus.

FIG. 14 shows an exemplary configuration in which the first receiving circuit 721 and the second receiving circuit 722 receive respective sensor signals S1 and S2.

The calculation device 73 includes a sensor value adding unit 731, a torque command calculation unit (TRQ COMMAND CALC) 732, a current feedback control unit (CURRENT FB CONTROL) 733, a signal abnormality detection unit (SIG ABNORM DETC) 735, a communication failure detection unit (COMM INTERPT DETC) 736, an excessive deviation detection unit (EXCV DEVIAT DETC) 737, and a time stamp abnormality detection unit (TIME STAMP ABNORM DETC) 738.

Suppose that each of the sensor signals S1 and S2 is in normal state.

The sensor value adding unit 731 adds the sensor signal S1 to the sensor signal S2, and outputs an addition value Ssum of the two sensor signals S1 and S2 to the torque command calculation unit 732.

The torque command calculation unit 732 calculates the torque command trq based on the acquired addition value Ssum. Further, the torque command calculation unit 732 stores a past addition value used in an immediately prior calculation in a memory.

The current feedback control unit 733 outputs, based on the torque command trq calculated by the torque command calculation unit 732, a voltage command to the inverter 78 so that the motor 80 outputs a required assist torque. The inverter 78 converts, based on the voltage command, a direct-current (DC) voltage supplied by a battery (not shown) to three-phased alternating-current (AC) voltage Vu, Vv, Vw, and applies the converted AC voltage to the motor 80.

The current feedback control unit 733 calculates the voltage command by performing a current feedback control. The current feedback control is carried out based on the phase currents Iv, Iw detected by the current sensors 791 and 792 and an electric angle θ detected by a rotational angle sensor 85.

The following will describe the signal abnormality detection unit 735, the communication failure detection unit 736, the excessive deviation detection unit 737, and the time stamp abnormality detection unit 738. Each of these units detects an abnormality of the sensor signal caused by a malfunction or an abnormality occurred in the sensing element 51 or the transmission circuit 54 of the sensor apparatus, or the signal line Ls. Herein, each of the sensor signals S1 and S2 is a nibble signal defined under SENT protocol, and includes time stamp t(S1) and t(S2) indicating the time information.

In the following description, a case where the number of normal sensor signals is equal to two is referred to as two sensor mode, and a case where the number of normal sensor signal is equal to one is referred to as one sensor mode. Herein, the normal sensor signal means the sensor signal is an effective signal to be used in the calculation performed by the torque command calculation unit 732 at an end time of the last determination regardless of the number of sensing elements the communication system actually has.

The following will describe a process when an abnormality is detected in the two sensor mode.

The signal abnormality detection unit 735 detects a signal abnormality in which the value of each sensor signals S1 and S2 has an apparently abnormal value.

The communication failure detection unit 736 detects a communication interruption abnormality in which a communication of each of the sensor signals S1 and S2 is interrupted.

The excessive deviation detection unit 737 detects an excessive deviation abnormality in which a deviation ΔS between the two sensor signals S1 and S2 has an excessively greater value than a predetermined level.

The time stamp abnormality detection unit 738 detects a time stamp abnormality in which each of time stamps t(S1) and t(S2) assigned to the respective sensor signals S1 and S2 does not conform to the time stamp used in the calculation performed by the calculation device 73.

In the two sensor mode, when the signal abnormality or the communication interruption abnormality is detected in one of the two sensor signals S1 and S2, as shown by a two-dot chain line in FIG. 14, the sensor value adding unit 731 selects only the value of the normal sensor signal. The addition value of the two sensor signals may be twice as much as the single normal sensor signal. Thus, the torque command calculation unit 732 carries out the calculation with consideration of this signal value difference.

In the two sensor mode, when the excessive deviation abnormality is detected, the torque command calculation unit holds the last value since it is difficult to specify which one of the two sensor signals S1 and S2 is abnormal.

In the two sensor mode, when the time stamp abnormality is detected in one of the two sensor signals S1 and S2, as shown in FIG. 15A, the torque command calculation unit 732 controls the torque command calculation gain (hereinafter, simply referred to as gain). The torque command calculation unit 732 corresponds to a calculation circuit. When the two sensor signals S1 and S2 are in normal states, the initial value of the gain is set to ko. At the time tx1, in response to the detection of the time stamp abnormality by the time stamp abnormality detection unit 738, the torque command calculation unit 732 gradually decreases the gain from the initial value ko. At the time tx2, when the value of the gain decreases to kx, the value of the gain is maintained at kx.

In order to avoid erroneous abnormality detection, the abnormality is surely determined at the time tx3 which is a period of time posterior to the time tx1 at which the time stamp abnormality is detected. Then, the torque command calculation unit 732 uses only the normal sensor signal value to calculate the torque command, and resets the value of gain to the initial value ko.

As described above, except the excessive deviation abnormality, the sensor signal which is determined to be abnormal is not used in the calculation of the torque command, and only the normal sensor signal is used in the calculation of the torque command. Thus, the two sensor mode switches to the one sensor mode.

The following will describe a process when an abnormality is detected in the one sensor mode. In the one sensor mode, the excessive deviation abnormality is not considered.

In one sensor mode, when the signal abnormality or the communication interruption abnormality is detected in the only one sensor signal, as shown by a chain line in FIG. 14, the torque command calculation unit 732 holds the last value.

In one sensor mode, when the time stamp abnormality is detected in the only one sensor signal, as shown in FIG. 15B, the torque command calculation unit 732 controls the gain of the torque command calculation gain. Until the time tx3, the gain is set similar to the one sensor mode.

When the abnormality is surely determined at the time tx3, the torque command calculation unit 732 sets the value of the gain to kx which is lower than the initial value ko, and performs the torque command calculation. With this configuration, the torque command calculation can be carried out without interruption while securing the calculation result from being affected by the sensor value having a low reliability.

In US 2013/0343472 A1, when the transmission function of the trigger signal has an abnormality, the calculation function of the microcomputer is completely interrupted. Compared with the configuration disclosed in US 2013/0343472 A1, the communication system according to the present embodiment can continue the calculation function with consideration of the reliability of the received sensor signal even when the time stamp of the sensor signal has an abnormality in one sensor mode. Thus, when the communication system is applied to the electric power steering apparatus 90, a complete operation failure of the torque assist function can be avoided.

OTHER EMBODIMENTS

Figure 16:
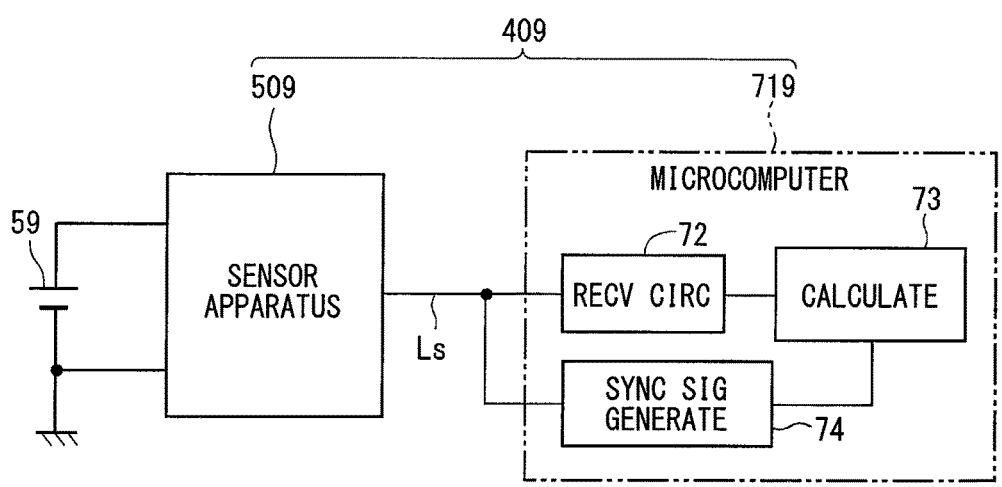
FIG. 16 is block diagram showing a configuration of a microcomputer according to another embodiment of the present disclosure.

In the foregoing embodiments, the sensor apparatus is connected with the control apparatus through the signal line Ls, the power supply line Lp, and the reference voltage line Lg. As another example of the communication system 409 shown in FIG. 16, the sensor apparatus 509 may be connected to an external power source 59 and receives power supply from the external power source 59. In this configuration, the sensor apparatus 509 is connected with the microcomputer 719 only through the signal line Ls. In this configuration, the power supply circuit in the control apparatus is not necessary, and the control apparatus mainly includes the microcomputer 719 without the power supply circuit. The sensor signal from the sensor apparatus 509 and the synchronization signal from the microcomputer 719 can be transmitted in bidirectional manner through the signal line Ls.

In the foregoing embodiments, the digital communication protocol of the communication system adopts SENT protocol. Alternatively, other communication protocols may be used in the communication system. For example, as the sensor signal, eight bit octet signal may be used instead of the four bit nibble signal.

In the foregoing embodiments, the sensing element adopts the hall element. Alternatively, other elements that can detect the magnetic field may be used as the sensing element. Further, an element detecting a varying physical quantity other than the magnetic field can be used as the sensing element. The physical quantity detected by the sensing element is not limited to the torque. The sensing element may detect physical quantities, such as a rotational angle, a stroke, a load, a pressure or the like.

The communication system according to the foregoing embodiments is applied to the electric power steering apparatus. Alternatively, the communication system according to the present disclosure may be applied to a different apparatus that requires the microcomputer to perform a control operation at a predetermined operation cycle based on the sensor signal detected by the sensor apparatus.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:
1. A communication system comprising:
   a sensor apparatus transmitting a sensor signal including detection information of a detection target as a digital signal; and
   a microcomputer receiving the sensor signal through a signal line and performing a control operation at a predetermined operation cycle based on the sensor signal that is received, wherein
   the sensor signal includes a series of signals including a first synchronization signal and a data signal following the first synchronization signal,
   the microcomputer transmits, to the sensor apparatus, a second synchronization signal which is synchronized with the predetermined operation cycle of the microcomputer,
   the sensor apparatus transmits the sensor signal at a predetermined constant cycle except when the second synchronization signal transmitted from the microcomputer is received, and
   the sensor apparatus changes a transmission timing of the sensor signal corresponding to the second synchronization signal when the second synchronization signal transmitted from the microcomputer is received.
2. The communication system according to claim 1, further comprising:
   a power supply circuit supplying a power voltage to the sensor apparatus, wherein
   the microcomputer and the power supply circuit configure a control apparatus,
   the sensor apparatus is connected with the control apparatus through the signal line, a reference voltage line, and a power supply line, and
   the power supply circuit supplies the power voltage to the sensor apparatus through the power supply line.
3. The communication system according to claim 2, wherein
   the microcomputer transmits the second synchronization signal to the sensor apparatus through the signal line.
4. The communication system according to claim 3, wherein
   the sensor apparatus includes a timer which determines the transmission timing of the sensor signal corresponding to a counting value, and the sensor apparatus changes the transmission timing of the sensor signal determined by the timer so that a transmission cycle shift caused by the timer is corrected.

5. The communication system according to claim 3, wherein
the microcomputer outputs the second synchronization signal at a time interval which is equal to a predetermined number of transmission cycles of the sensor signal.

6. The communication system according to claim 5, wherein,
after the microcomputer is activated, the microcomputer continuously outputs the second synchronization signal until a time point at which the sensor signal being transmitted during an activation operation of the microcomputer is ended.

7. The communication system according to claim 2, wherein
the microcomputer controls an output of the power supply circuit,
the output of the power supply circuit is transmitted to the sensor apparatus through the power supply line, and
the microcomputer transmits the output of the power supply circuit as the second synchronization signal.

8. The communication system according to claim 7, wherein
the microcomputer outputs the second synchronization signal by changing a power voltage value supplied by the power supply circuit or by switching a power voltage supply state between a start state and a stop state.

9. The communication system according to claim 2, further comprising:
one or more sensor apparatus in addition to the sensor apparatus, wherein
the sensor apparatus and the one or more sensor apparatus are connected to the control apparatus through respective signal lines, respective reference voltage lines, and respective power supply lines.

10. The communication system according to claim 9, wherein
the microcomputer outputs the second synchronization signal so that transmission timings of sensor signals transmitted from the sensor apparatus and the one or more sensor apparatus are different from one another.

11. The communication system according to claim 10, wherein
the microcomputer sets power supply timings from the power supply circuit to the sensor apparatus and the one or more sensor apparatus to be different from one another.

12. The communication system according to claim 1, wherein
the sensor signal adopts a nibble signal defined under SAE-J2716 which is a standard set by Society of Automotive Engineers International.

13. The communication system according to claim 12, wherein
the nibble signal is assigned with a time stamp indicating time information, and
the microcomputer determines a time stamp abnormality when the time stamp assigned to the nibble signal is different from a time stamp used in a calculation performed by the microcomputer.

14. The communication system according to claim 13, wherein
the microcomputer includes a calculation circuit, and,
when the microcomputer determines the time stamp abnormality, the calculation circuit decreases a gain to be multiplied with the sensor signal when performing a sensor signal related calculation.

15. The communication system according to claim 1, wherein
the communication system is applied to an electric power steering apparatus equipped to a vehicle,
the sensor apparatus detects an operation torque applied by a driver of the vehicle, and
the microcomputer calculates, based on the operation torque detected by the sensor apparatus, a torque command indicating an assist torque required to be outputted by a motor.

16. A communication system comprising:
a first sensor apparatus transmitting a first sensor signal including detection information of a detection target as a digital signal;
a second sensor apparatus transmitting a second sensor signal including different detection information of a different detection target as a different digital signal; and
a microcomputer receiving the first sensor signal transmitted from the first sensor apparatus and the second sensor signal transmitted from the second sensor apparatus through a signal line, and the microcomputer performing a control operation at a predetermined operation cycle based on the first sensor signal and the second sensor signal,
wherein
each of the first sensor signal and the second sensor signal includes a series of signals including a first synchronization signal and a data signal following the first synchronization signal,
the microcomputer transmits, to the first sensor apparatus and the second sensor apparatus, a second synchronization signal which is synchronized with the predetermined operation cycle of the microcomputer,
each of the first sensor apparatus and the second sensor apparatus transmits a corresponding sensor signal, which is one of the first sensor signal and the second sensor signal, at a predetermined constant cycle except when the second synchronization signal transmitted from the microcomputer is received, and
each of the first sensor apparatus and the second sensor apparatus changes a transmission timing of the corresponding sensor signal, which is one of the first sensor signal and the second sensor signal, based on the second synchronization signal when the second synchronization signal transmitted from the microcomputer is received.

* * * * *